(12) United States Patent
Haikin

(10) Patent No.: US 6,831,999 B2
(45) Date of Patent: Dec. 14, 2004

(54) COLOR MANAGEMENT ARCHITECTURE USING PHANTOM PROFILES TO TRANSFER DATA BETWEEN TRANSFORMATION MODULES

(75) Inventor: John S. Haikin, Fremont, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 674 days.

(21) Appl. No.: 09/778,925

(22) Filed: Feb. 8, 2001

(65) Prior Publication Data

US 2002/0105660 A1 Aug. 8, 2002

(51) Int. Cl.$^7$ .................................................. G06K 9/00
(52) U.S. Cl. ..................................... 382/162; 358/524
(58) Field of Search ............................... 382/162–167; 358/518–524; 345/589–603

(56) References Cited

U.S. PATENT DOCUMENTS

| 5,668,596 A | | 9/1997 | Vogel ........................ 348/222 |
| 5,806,081 A | * | 9/1998 | Swen et al. ................. 715/528 |
| 5,978,107 A | | 11/1999 | Murai et al. ................ 358/520 |
| 5,999,703 A | | 12/1999 | Schwartz et al. ........... 395/109 |
| 6,008,907 A | | 12/1999 | Vigneau et al. ............. 358/1.9 |
| 6,035,103 A | | 3/2000 | Zuber ......................... 395/109 |
| 6,072,901 A | | 6/2000 | Balonon-Rosen ........... 382/167 |
| 6,075,888 A | | 6/2000 | Schwartz .................... 382/167 |
| 6,088,038 A | | 7/2000 | Edge et al. ................. 345/431 |
| 6,091,518 A | * | 7/2000 | Anabuki ..................... 358/500 |
| 6,128,415 A | | 10/2000 | Hultgren, III .............. 382/276 |
| 6,549,654 B1 | * | 4/2003 | Kumada ..................... 382/162 |
| 6,603,879 B2 | * | 8/2003 | Haikin et al. .............. 382/167 |
| 6,642,934 B2 | * | 11/2003 | Hrusecky et al. .......... 345/629 |

OTHER PUBLICATIONS

"File Format For Color Profiles", ICC Specification No. ICC.1:1998–09 (1998), as amended by "Addendum 2", Document No. ICC.1A:1999–04 (1999).

* cited by examiner

*Primary Examiner*—Jingge Wu
(74) *Attorney, Agent, or Firm*—Fitzpatrick, Cella, Harper & Scinto

(57) ABSTRACT

A color management architecture includes multiple color transform modules chainable together by a framework, with each color transform module having access to color profiles which provide data necessary to convert color data in accordance with algorithmic functionality in the transform modules. The color profiles are stored in accordance with a pre-designated format, such as a standardized format that is neither vendor specific nor platform specific. Each color transform module further includes the functionality to read to and write from a phantom profile. The phantom profile is also organized in the same pre-designated format, and thus serves as a primary conduit for data transfer between chained ones of the color transform modules.

17 Claims, 4 Drawing Sheets

COLOR MANAGEMENT ARCHITECTURE USING PHANTOM PROFILES TO TRANSFER DATA BETWEEN TRANSFORMATION MODULES

BACKGROUND OF THE INVENTION

1. Field of the Invention

The present invention relates to color management architecture in which plural transformation modules each act to transform color data from an input side to an output side, and particularly relates to use of a phantom profile so as to transfer data from one transformation module to another.

2. Description of the Related Art

Since 1993, the International Color Consortium (HTTP://www.color.org/) has acted to promote a standardized architecture and standardized components for an open, vendor-neutral, cross-platform color management system. A representative architecture using such components is illustrated in FIG. 1. As seen there, an application 10 executing under an operating system has access to a graphics library 11 and an imaging library 12. To perform color management functionality, application 10 accesses a color management framework interface 14, which in turn has access to color profiles 15 and a default color management module 16. Interface 14 also allows access to third party color management modules illustrated diagrammatically at 17 and 18. Profiles 15 provide the color management modules with information necessary to transform color data, such as a conversion between a native device color space and a device independent color space. For each different kind of color device, different algorithmic models are described which perform transformation between the color spaces based on the color information in the color profiles 15. These algorithmic models are realized programmatically within transformation modules of the color management modules, as illustrated below in FIG. 2.

FIG. 2 shows a color management framework in which three transformation modules serially perform color transformation, each between an input side and an output side. The overall result of processing by the three modules illustrated in FIG. 2 might, for example, correspond to a transformation from an input device color space to a device neutral color space (module 1), a gamut mapping so as to ensure that colors properly are within the outputable gamut of an output device (module 2), and a transformation from the gamut-mapped device independent color space into an output color space (module 3). As seen in FIG. 2, a first module 20 derives input from a variety of different sources. For example, in the context of FIG. 2, module 20 derives input information from four different sources. First, input information is passed as a parameter from the color management framework 14 as part of an initial function call that activates module 20. Second, module 20 access data in one of the color profiles 15 which define the color information necessary to convert color data between color spaces. Third, local data 24 is maintained in an area accessible only by the module itself, such as pre-designated data specific to initialization of the module. Fourth, each module can access global data in a global data pool 25.

Recently, color management has focused on the construction of a color management pipeline in which a pipeline script defines transformation modules that apply serially, step-by-step, so as to transform color data from a given input to a target output. Because of a desire to maintain a vendor-neutral, cross-platform color management system, however, the large variety of data sources available to the transformation modules causes difficulties. For example, different platforms and different vendors might pass parameters differently from framework 14 to each individual module. And, each individual module might store data differently in global data area 25, in dependence on the vendor who wrote the module and the platform on which the module is executing. Particularly in situations where a color management pipeline is used, because the global data area 25 is the primary source of transferring data between the different modules, such a situation can lead to difficulties in data transfer and can yield unexpected and unintended color management results.

SUMMARY OF THE INVENTION

It is an object of the invention to address the foregoing difficulties through use of color transformation modules that transfer data into and out of the module through a phantom profile whose organizational format is the same as that of standardized color profiles.

Thus, according to one aspect of the invention, each of multiple color transformation modules, which can be pipelined together to yield a desired color transformation from a desired input color space to a desired output color space, includes software functionality that permits the color transform module to write profiles as well as to read them. One particular profile that is writable and readable by each color transform module is a phantom profile. The phantom profile serves as the primary conduit of data transfer between one color transform module and others, as well as the primary data conduit for transfer of data from the framework to the modules.

In particularly preferred embodiments, the phantom profile is defined in accordance with the format used by other color profiles, particularly color profiles as standardized by the ICC.

By virtue of the foregoing features, the invention provides for vendor-neutral cross-platform color management since data is transferred between color transform modules in a format corresponding to standard color profiles. Because the profiles are standardized, vendor-specific and platform-specific anomalies that might result from data transfer to a global memory area are avoided.

In particularly preferred embodiments, the color transform modules are chained together in a pipeline specified by a pipeline script which defines which modules are needed to transform the data, as well as which color profiles are needed to supply the color conversion information. Each module in the pipeline carries with it its own local data, which is managed by the transform module itself. This local data is set aside by the module when it initializes itself, and the local data is then available to the module whenever the module is actively processing image data. This local image data is available only to the transform module that uses and creates it. On the other hand, information from outside the module, such as information about the characteristics of the device or information from prior transformation modules, is provided in standardized format by a profile. Most commonly, the profiles are either color profiles which contain information necessary to transform color data, or a phantom profile which contains data accessible to all transform modules, including data passed from the framework or data passed from previous color transform modules.

This brief summary has been provided so that the nature of the invention may be understood quickly. A more complete understanding of the invention can be obtained by reference to the following detailed description of the preferred embodiment thereof in connection with the attached drawings.

DESCRIPTION OF THE PREFERRED EMBODIMENTS

Figure 1:
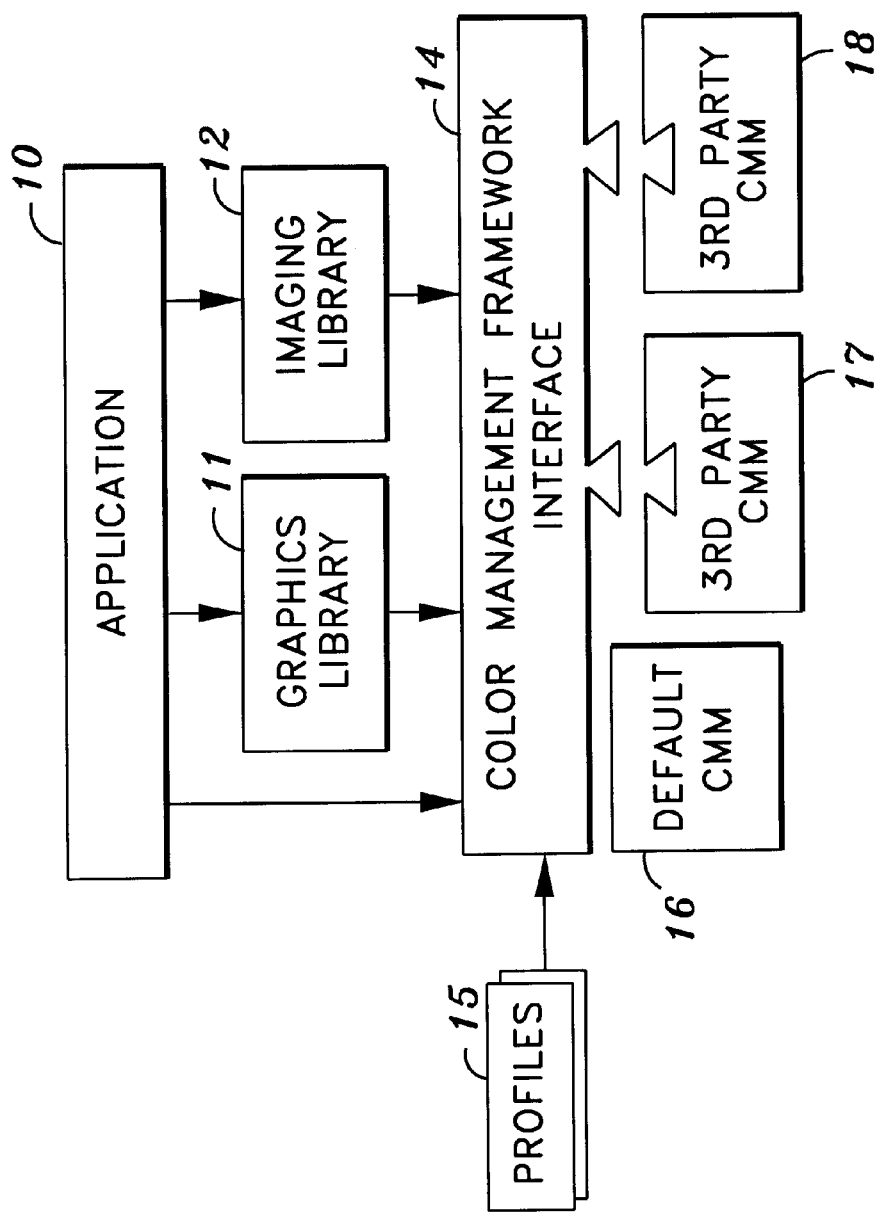
FIG. 1 is a block diagram showing a conventional color management architecture.
Figure 2:
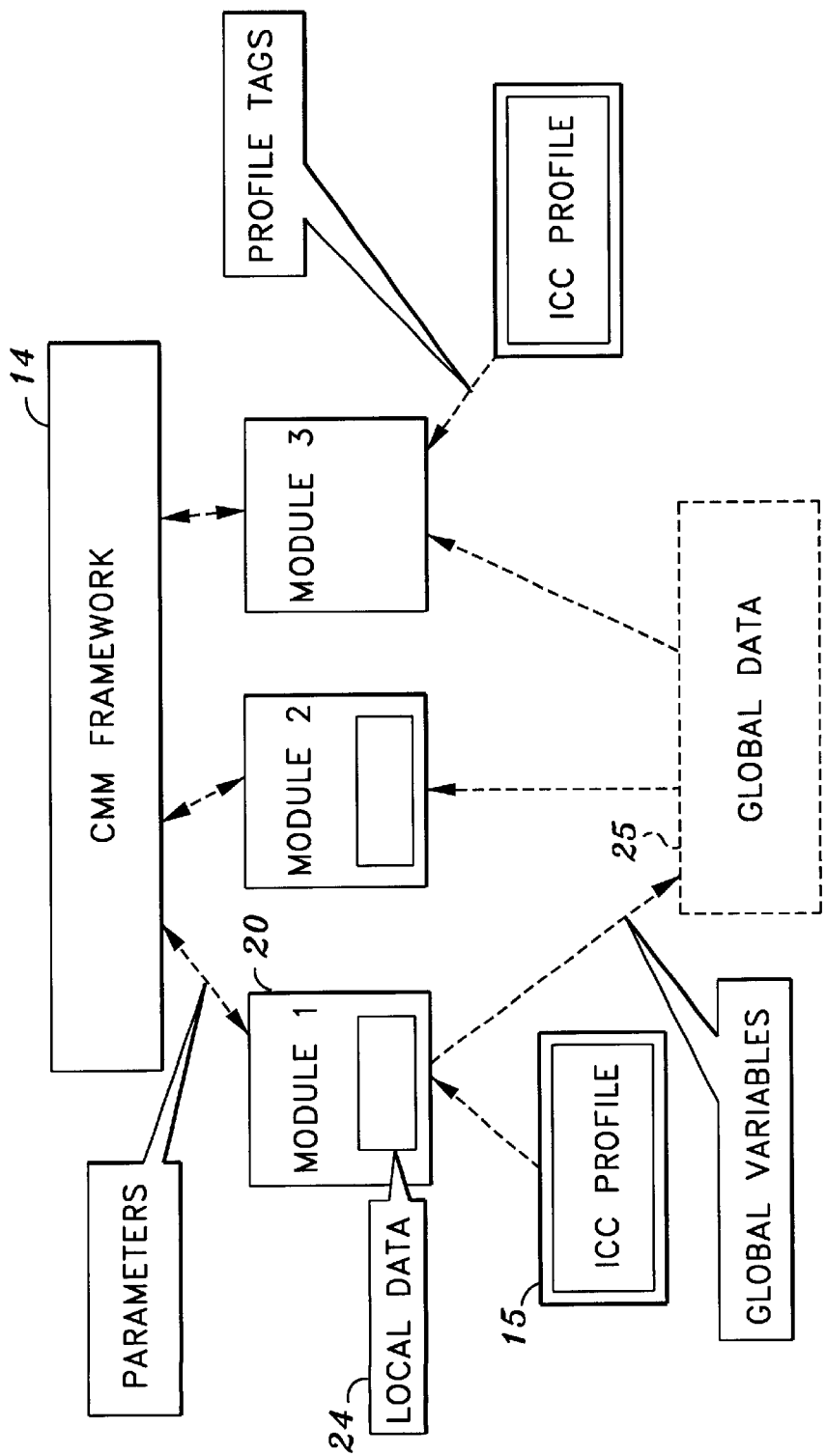
FIG. 2 is a block diagram showing a conventional technique for transferring data between color transform modules in a color management framework.
Figure 3:
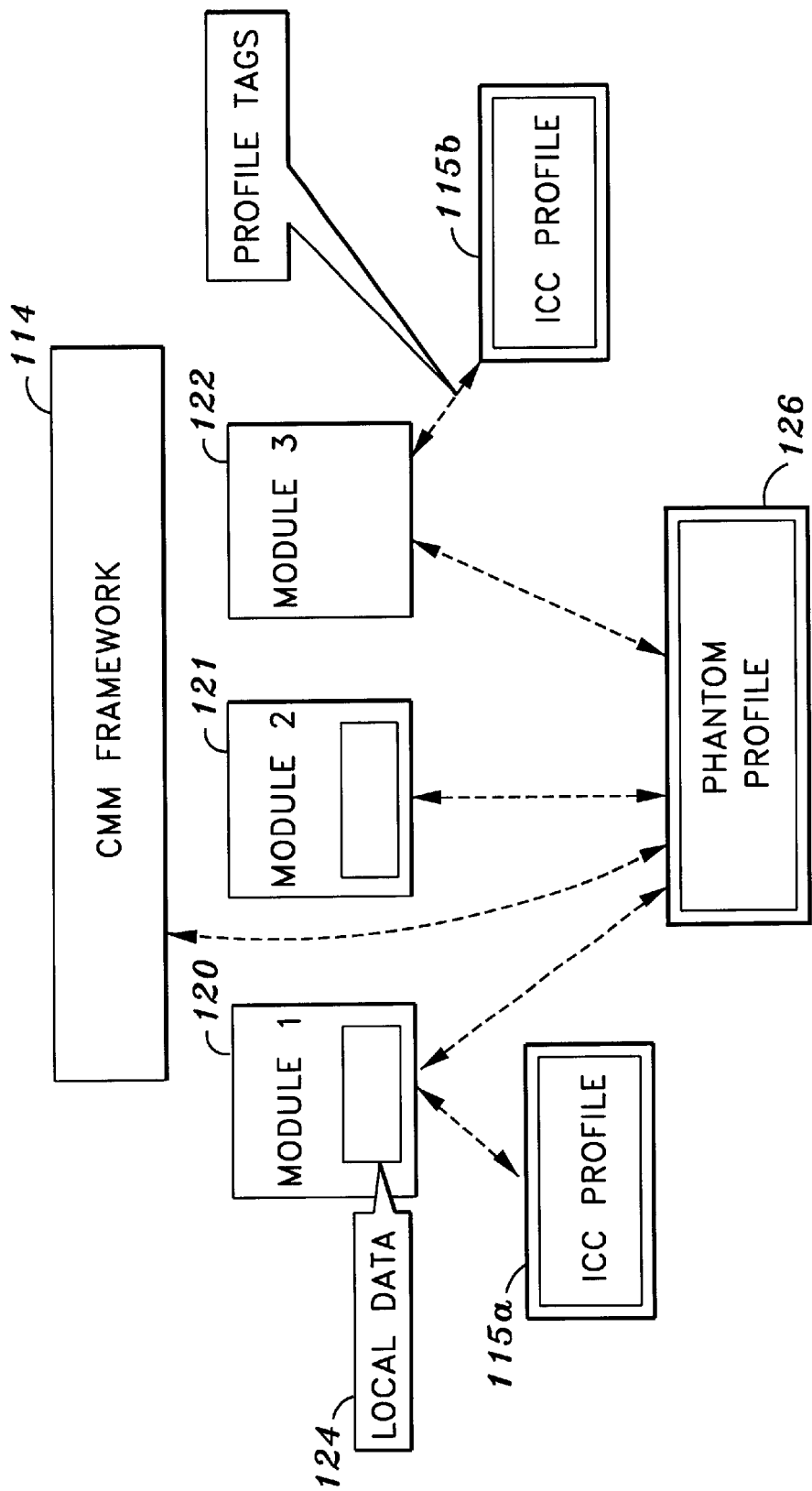
FIG. 3 is a block diagram for explaining transfer of data between color transform modules according to the invention.

FIG. 3 is a block diagram showing a representative embodiment of the invention, in which transform modules, in addition to functionality permitting the transform module to read a profile, also include functionality to write to profiles. Briefly, according to the invention, transform modules transfer data between themselves, or with the color management framework, by reading and writing to one or more phantom profiles, as discussed more fully below.

Thus, as shown in FIG. 3, color management framework 114 provides a framework for color management including an architecture to convert color data in a first color space (such as a source device color space) to a second color space (such as a destination device color space). Framework 114 works by chaining together color transform functionality provided by individual ones of multiple transform modules illustrated here at 120, 121 and 122. The chain provided by framework 114 can be specified in a pipeline script which is read by the framework 114. The script is specified, either directly or indirectly, with a color image for which color management is desired.

Particularly in the case where a script provides for a transformation pipeline, the script specifies individual transform elements in the order that they are to be executed. The sequence of executable steps is assembled by framework 114 at "runtime", that is, after the script has been read but before the image is color managed. The algorithmic functionality needed for each transform module is taken from a library of pre-designated modules that is maintained by framework 114. It is intended in this architecture that the functionality of each transform module is as general as possible so that it is possible to include the functionality in the library, along with the script, in the image, or in color profiles themselves, in order to provide a complete color management package.

Each transform module includes functionality to read color profiles. In one aspect that focuses on color characteristics of devices, color profiles store information needed to convert color data between color spaces, such as between a native device color space and a device independent color space. Preferably, color profiles are correlated with each different device model so as to provide color characteristics of the model. For example, a first device profile might be provided in correlation with a first model of ink jet printers from a manufacturer, and a second device profile might be provided in correlation with a second model of ink jet printers from the same manufacturer. It is generally intended that each different color device (scanners, printers, displays, and the like) be provided with an individualized device profile tailored to the color characteristics of the device in question, although it is possible that in the absence of tailored device data (for example, in a situation where a manufacturer has not yet or will not provide tailored color data), default color profiles might be used instead.

Color profiles also exist to specify information needed for other types of transformations or mappings, such as transformations to or from perceptual color spaces, or gamut parameters for gamut mapping algorithms.

The color profiles are stored in a standardized, pre-designated format, thereby ensuring that each different transform module can read the profile, regardless of vendor or platform-specific differences. In preferred embodiments, the color profiles conform to the format specified by the International Color Consortium at "File Format For Color Profiles", ICC Specification No. ICC.1:1998-09 (1998), as amended by "Addendum 2", Document No. ICC.1A:1999-04 (1999).

The color profiles specified by the ICC provide for standardized formats of needed color information, including device transform color information, gamut mapping information, coordinate transform information (such as transforms to perceptual color space) and the like.

In accordance with the invention, and as further shown in FIG. 3, each transform module includes functionality to write profiles. Coupled with the functionality to read profiles, each transform module includes functionality that permits it to read from and write to a phantom profile 126, although more than a single phantom profile may be provided in other embodiments of the invention. Preferably, phantom profile 126 (alone or in conjunction with other phantom profiles) is the primary interface for transferring data between multiple ones of the transform modules, and between the framework 114 and the modules.

In more detail, and assuming framework 114 has chained modules 120, 121 and 122 as shown in FIG. 3, framework 114 deposits parameters needed to initiate the transform process into phantom profile 126. First module 120 reads the parameters from the phantom profile, as well as color data needed for its transform functionality from ICC profile 115a. After initializing local data 124, transform module 120 performs its color transform algorithmic functionality, for example, to transform color data from a source device color space into color data in a device independent color space. At the conclusion of its transform functionality, first module 120 writes transformed data back to phantom profile 126 and otherwise signifies to framework 114 that its transform functionality has been completed.

Framework 114 then initiates processing by second module 121, again with any needed parameters being written to phantom profile 126. Second module 121 initiates its color transform algorithmic functionality based on information read from phantom profile 126, together with any information needed by (unshown) color profiles. For example, second module 121 might perform gamut mapping. When transform 121 completes its color processing functionality, it writes its results to phantom profile 126, and otherwise signifies to framework 114 that its processing has been completed.

Framework 114 then initiates processing of third module 122, again with parameters needed by module 122 being written to phantom profile 126. Third module 122 reads needed data from phantom profile 126 as well as color data from color profile 115b, and applies its color transform functionality. For example, third module 122 might transform gamut-mapped color data into destination device color coordinates. Module 122 writes transformed data to phantom profile 126, and otherwise signifies to framework 114 that its processing is complete. Framework 114 then provides the transformed data back to the software application that initialled had requested color management.

Figure 4A:
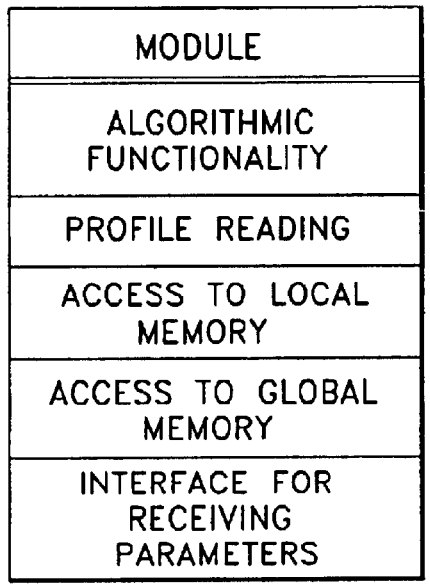
FIGS. 4A, 4B, 4C and 4D are views for comparing functionality of a conventional color transform module with that of color transform modules according to the invention.
Figure 4B:
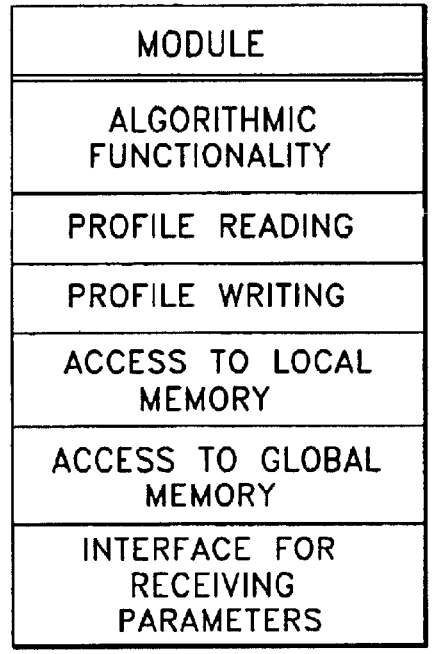
Figure 4C:
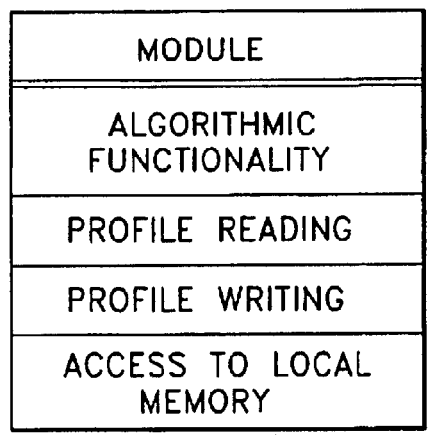

FIGS. 4B and 4C are block diagrams showing internal functionality of each of the multiple transform modules chainable by framework 114. FIG. 4A shows transform module functionality according to the prior art, for comparison purposes. As seen in FIGS. 4B and 4C, transform modules according to the invention include functionality to write profiles, including a write to phantom profile(s) which form the primary conduit for transfer of data between multiple ones of the transform modules as well as between the framework and the modules. As seen in FIG. 4B, it is also possible for at least some of the transform modules to access global memory so as to permit data transfer, as well as to provide an interface to framework 114 for receiving parameters therefrom. On the other hand, and as shown in FIG. 4C, at least some of the transform modules might be constrained such that their only functionality by which data can be transferred into and out of the transform module is by means of profile reading and writing. In particular, the module shown in FIG. 4C simply does not include functionality for access to global memory, or for an interface with framework 114 for receiving parameters.

Figure 4D:
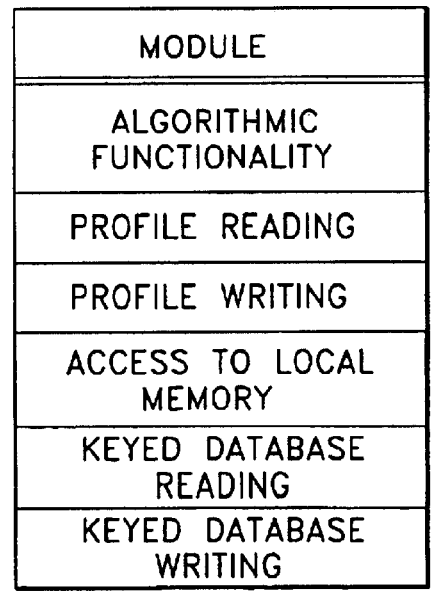

FIG. 4D shows a different embodiment, in which data transfer between modules is accomplished through reads and writes to a database in accordance with indexed keys into the database. Specifically, as seen in FIG. 4D, transform modules include functionality to read and to write to profiles, primarily to obtain needed color or transform data for the algorithmic functionality of the module. In addition, the transform modules include functionality to read and to write to a database or databases, such as through a keyed index into the database(s). Through such keyed reads and writes to the database(s), the transform modules transfer data between multiple ones of the modules, as well as transfer data and initialization parameters to and from the framework. It is also possible for the modules to access the database(s) in connection with their algorithmic functionality, so as to permit expanded and/or more customizable features to the algorithmic functionality.

Other configurations for the modules are possible, such as a configuration in which only access to global memory is omitted, or only an interface for receiving parameters is omitted, relative to the configuration shown in FIG. 4B. In addition, it is possible to combine modules from the different embodiments in one pipelined transform, such that some modules have access to global memory and some do not, for example; and such that some modules transfer data therebetween via phantom profiles and some do not, as another example.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A color management architecture, comprising:
   multiple transform modules each providing algorithmic functionality for effecting color transformation and each including functionality to read from and write to profiles;
   multiple color profiles each including information necessary to effect a color transformation, and each being organized in accordance with a pre-designated format;
   a framework for chaining together multiple ones of the plural transform modules so as to effect a commanded color transformation; and
   at least one phantom profile readable and writable by chained ones of the transform module;
   wherein the at least one phantom profile is organized in the same pre-designated format as the color profiles; and
   wherein data transfer between the chained ones of the transform modules is effected by a write to the phantom profile by a first one of the chained transform modules, followed by a read from the phantom profile by a second one of the chained transform modules.

2. A color management architecture according to claim 1, wherein said framework effects transfer of information to and from at least some of the chained transform modules by a read to and a write from the phantom profile.

3. A color management architecture according to claim 1, wherein at least some of the transform modules include functionality to access global memory.

4. A color management architecture according to claim 1, wherein at least some of the transform modules exclude functionality to access global memory.

5. A color management architecture according to claim 1, wherein at least some of the transform modules include an interface for receiving data from the framework.

6. A color management architecture according to claim 1, wherein at least some of the transform modules exclude an interface for receiving data from the framework.

7. A color management architecture according to claim 1, wherein the framework chains multiple transform modules together in accordance with a pipeline script.

8. A color management architecture according to claim 1, wherein the pre-designated format is a format defined by a standards group.

9. A color management architecture according to claim 1, wherein the pre-designated format is a format not specific to vendors and not specific to platforms.

10. A method for color management in a color management architecture that includes first and second transform modules, each of the first and second transform modules including color transform algorithmic functionality as well as functionality to read to and write from profiles, said color management method comprising:
    a first reading step, by the first transform module, of reading data from a color profile, the color profile being organized in a pre-designated format and containing data needed by the first transform for its color transform algorithm functionality;
    a first processing step, by the first transform module, of processing color data in accordance with the data read from the color profiles;
    a first writing step, by the first transform module, of writing transform data to a phantom profile;
    a second reading step, by the second transform module, of reading a color profile, the color profile being organized in the pre-designated format and containing data needed by the second transform for its color transform algorithm functionality;
    a third reading step, by the second transform module, of reading data written by the first transform module from the phantom profile; and
    a second processing step, by the second transform module, of processing color data in accordance with the data read from the color profiles;
    wherein the phantom profile is organized in the same pre-designated format as the format of the color profiles.

11. A method according to claim 10, further comprising the step of chaining together the first and second transform modules by a framework also included in the color management architecture.

12. A method according to claim 11, wherein the first and second transform modules are chained together in accordance with a pipeline script.

13. A method according to claim 11, further comprising the steps of writing, by the framework, of initialization parameters into the phantom profile, and reading the initialization parameters from the phantom profile by the first transform module.

14. A method according to claim 11, further comprising the steps of writing, by the second transform module, of the transformed color data into the phantom profile, and reading of the transformed color data from the phantom profile by the framework.

15. An apparatus for color management in a color management architecture that includes first and second transform modules, each of the first and second transform modules including color transform algorithmic functionality as well as functionality to read to and write from profiles, comprising:

a program memory for storing process steps executable to perform a method according to any of claims 10 to 14; and a processor for executing the process steps stored in said program memory.

16. Computer-executable process steps stored on a computer readable medium, aid computer-executable process steps for color management in a color management architecture that includes first and second transform modules, each of the first and second transform modules including color transform algorithmic functionality as well as functionality to read to and write from profiles, said computer-executable process steps comprising process steps executable to perform a method according to any of claims 10 to 14.

17. A computer-readable medium which stores computer-executable process steps, the computer-executable process steps for color management in a color management architecture that includes first and second transform modules, each of the first and second transform modules including color transform algorithmic functionality as well as functionality to read to and write from profiles, said computer-executable process steps comprising process steps executable to perform a method according to any of claims 10 to 14.

* * * * *

UNITED STATES PATENT AND TRADEMARK OFFICE
CERTIFICATE OF CORRECTION

PATENT NO. : 6,831,999 B2  
DATED : December 14, 2004  
INVENTOR(S) : John S. Haikin It is certified that error appears in the above-identified patent and that said Letters Patent is hereby corrected as shown below:

Column 5,
Line 3, "initialled" should read -- initially --.

Column 6,
Line 5, "module;" should read -- modules; --.

Column 8,
Line 4, "aid" should read -- said --.

Signed and Sealed this

Third Day of May, 2005

JON W. DUDAS
*Director of the United States Patent and Trademark Office*